(12) United States Patent
Yata

(10) Patent No.: US 6,661,450 B2
(45) Date of Patent: Dec. 9, 2003

(54) AUTOMATIC FOLLOWING DEVICE

(75) Inventor: Kunio Yata, Omiya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 431 days.

(21) Appl. No.: 09/726,496

(22) Filed: Dec. 1, 2000

(65) Prior Publication Data
US 2001/0002843 A1 Jun. 7, 2001

(30) Foreign Application Priority Data

| Dec. 3, 1999 | (JP) | 11-344840 |
| Dec. 10, 1999 | (JP) | 11-351916 |
| Dec. 13, 1999 | (JP) | 11-352851 |
| Mar. 16, 2000 | (JP) | 2000-074400 |

(51) Int. Cl.[7] .............................. H04N 7/18
(52) U.S. Cl. ............ 348/169; 348/143; 348/211.6
(58) Field of Search .................. 348/169–170, 348/171, 172, 143, 211.6; H04N 7/18

(56) References Cited

U.S. PATENT DOCUMENTS

| 5,278,643 A | * | 1/1994 | Takemoto et al. | 348/211.6 |
| 5,371,536 A | * | 12/1994 | Yamaguchi | 348/169 |
| 5,434,617 A | * | 7/1995 | Bianchi | 348/169 |
| 5,526,041 A | * | 6/1996 | Glatt | 348/143 |
| 5,898,459 A | * | 4/1999 | Smith et al. | 348/169 |
| 6,166,763 A | * | 12/2000 | Rhodes et al. | 348/143 |
| 6,323,898 B1 | * | 11/2001 | Koyanagi et al. | 348/169 |
| 6,359,647 B1 | * | 3/2002 | Sengupta et al. | 348/169 |

FOREIGN PATENT DOCUMENTS

| JP | 59208983 | 11/1984 |
| JP | 614698 | 2/1994 |

* cited by examiner

Primary Examiner—Howard Britton
(74) Attorney, Agent, or Firm—Birch, Stewart, Kolasch & Birch, LLP

(57) ABSTRACT

Shootings for automatic following are previously registered in a memory of a pan head controller. When the automatic following is started, a CPU of the pan head controller chooses a shooting among the shootings registered in the memory according to a center position of a subject inputted from an image processing device so that the subject is in a frame of a camera, and transmits a control signal to a pan head for the shooting.

7 Claims, 19 Drawing Sheets

F I G. 6
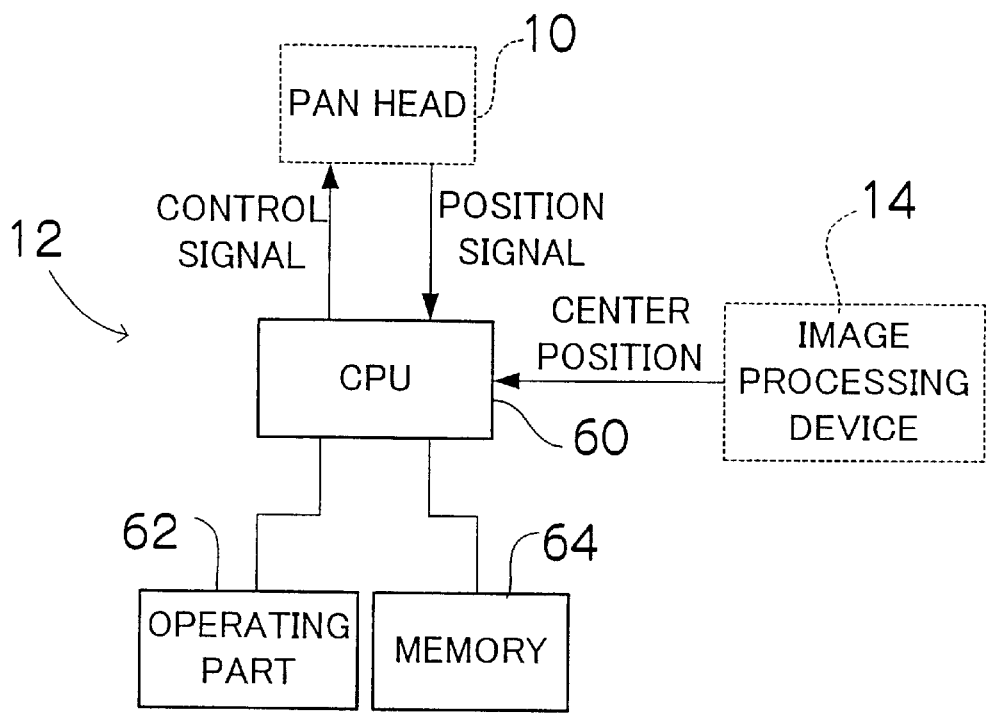

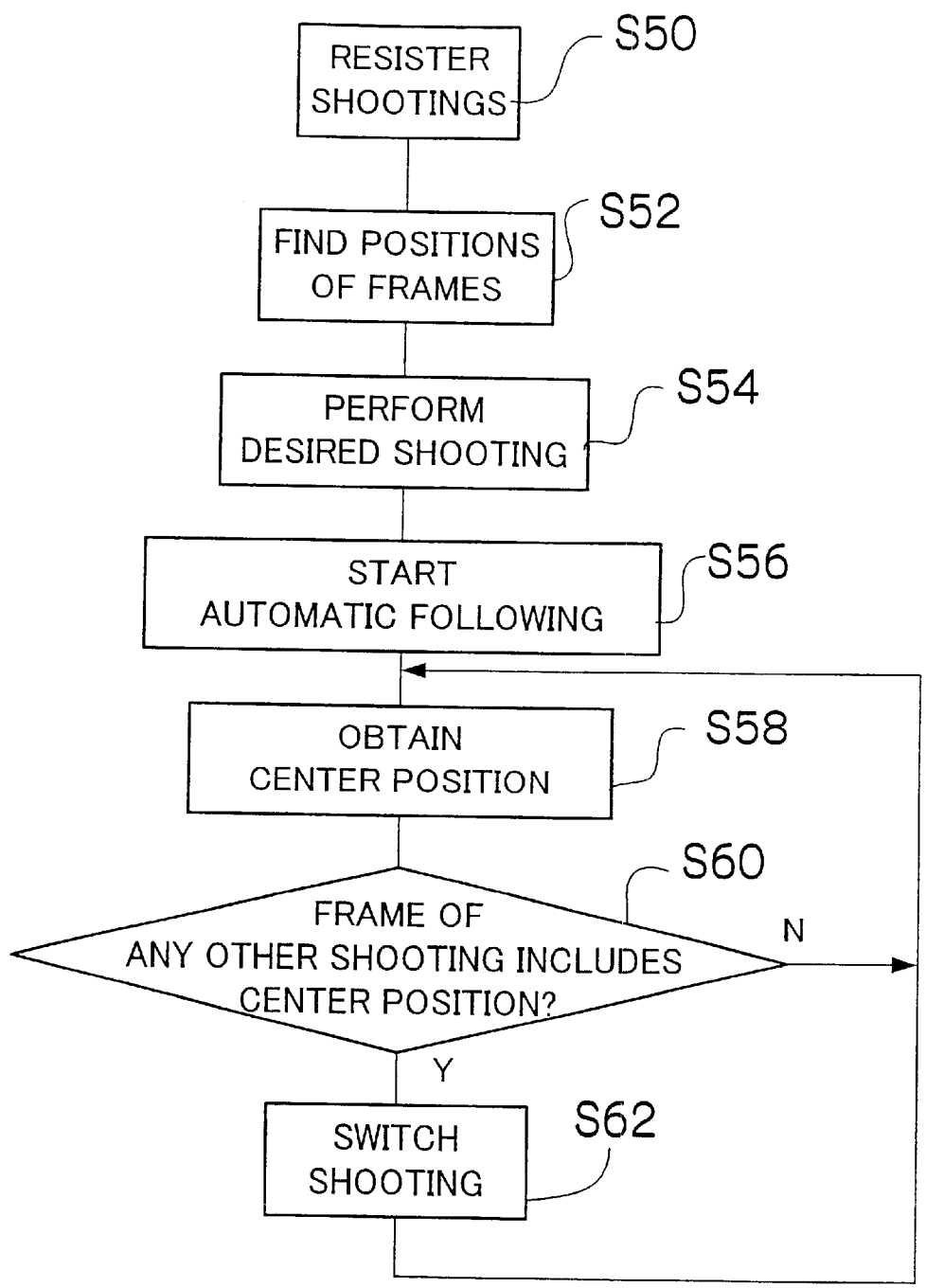
F I G. 7

INSENSITIVE AREA

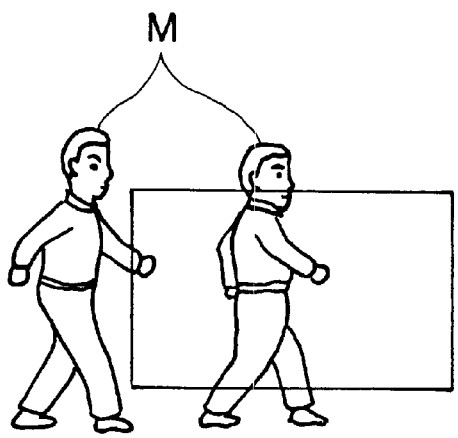
F I G. 1 7 (A)
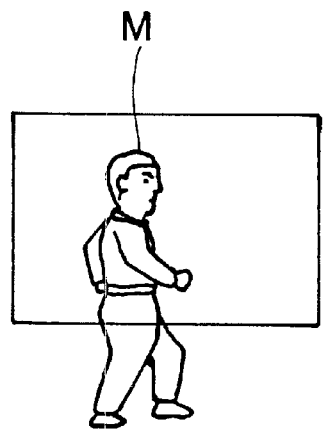
F I G. 1 7 (B)

FIG. 20(A)
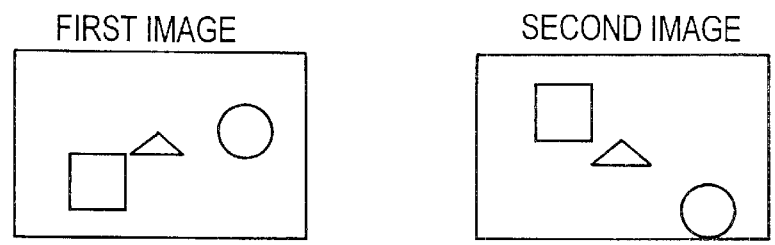
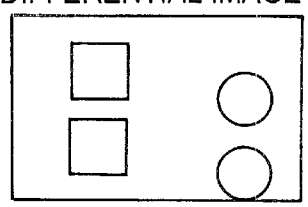
FIG. 20(B)
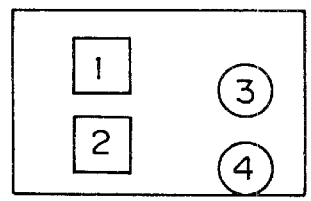
FIG. 20(C)
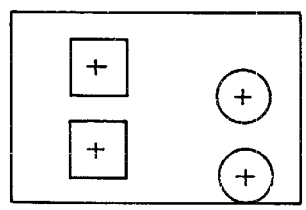
FIG. 20(D)
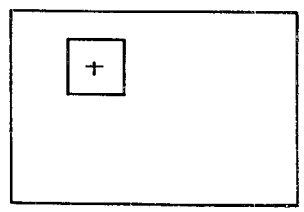
FIG. 20(E)

AUTOMATIC FOLLOWING DEVICE

BACKGROUND OF THE INVENTION

1. Field of the Invention

The present invention relates generally to an automatic following device, and more particularly to an automatic following device that automatically follows a desired subject by changing a shooting condition such as a shooting direction of a camera.

2. Description of Related Art

An automatic following device automatically changes a shooting direction of a camera mounted on a pan head by panning and tilting the camera with motors to follow a moving subject. Japanese Patent Publication No. 6-14698 discloses an automatic following method in which a differential image between two images with a predetermined time interval is acquired in order to abstract an moving subject, and a moving amount and a moving direction of the subject are determined from a center position of the subject. Then, the shooting direction of the camera is automatically changed by a pan head according to the determined moving amount and moving direction of the subject so that the moving subject is the center of a frame of the camera.

In the above-described method, however, since the camera is panned and tilted so that the subject is the center of the frame, the camera is panned and tilted when the subject moves even a little in the frame, and thus the image is blurred.

Also, in case a person is followed as the subject, the head of the person is in the upper part of the frame, and the head can be out of the frame. The above-described method is not always desirable when a specific part of the subject is shot while the subject is followed.

In addition, in case there are a plurality of moving subjects in the frame, the appropriate subject to be followed can not be determined, and the desired subject can not be appropriately followed.

SUMMARY OF THE INVENTION

It is therefore an object of the present invention to provide an automatic following device that can follow a subject while minimizing an operation of a camera to obtain an image that is not blurred.

It is therefore an object of the present invention to provide an automatic following device that can follow a subject while shooting a specific part other than a center position of the subject.

It is therefore an object of the present invention to provide an automatic following device that can follow only a desired subject even if there are a plurality of moving subjects in a frame of a camera.

The above object can be achieved by providing an automatic following device that follows a subject by changing a shooting condition that is at least one of a shooting direction and a view angle of a camera, the automatic following device comprising: a shooting registering device that previously registers one or more shootings by setting shooting conditions of the camera; a position determining device that determines a position of the subject; and a shooting changing device that changes one of the shootings to another registered by the shooting registering device according to the position of the subject determined by the position determining device so that the subject is in a frame of the camera.

According to the present invention, the shooting is switched only to another registered shooting according to the position of the subject to be followed so that the subject is the center of the frame. Thus, the shooting condition does not change even if the subject to be followed moves a little within the field of view. Therefore, the image shot by the camera is not blurred. Also, since the desired zooming position as well as the panning position and the tilting position can be stored as the shooting conditions, the shooting is performed with the appropriate view angle according to the panning position and the tilting position.

The above object can be achieved by providing an automatic following device that follows a subject by changing a shooting direction of a camera, the automatic following device comprising: a position determining device that determines a position of the subject; a determining device that determines whether or not the subject is in an insensitive area set in a frame of the camera; and a controlling device that does not change the shooting direction when the determining device determines that the subject is in the insensitive area and changes the shooting direction to follow the subject when the determining device determines that the subject is out of the insensitive area.

According to the present invention, the insensitive area is set in the frame, and only when the center position is out of the insensitive area, the camera is turned to shoot the subject. Thus, the shooting direction of the camera does not change even if the subject moves a little in the frame, and therefore the image is not blurred.

The range of the insensitive area is determined according to the position of the subject to be followed. For example, the farther the subject is from the center of the frame, the smaller the range of the insensitive area is. Therefore, the subject never goes out of the frame to be followed.

The above object can be achieved by providing an automatic following device that follows a subject by changing a shooting direction of a camera, the automatic following device comprising a controlling device that changes the shooting direction so that a specific part other than a center position of the subject is in a frame of the camera.

The controlling device changes the shooting direction so that the specific part of the subject is the center of the frame of the camera.

The controlling device determines the specific part of the subject so that an area ratio of one side of the subject divided along a vertical line with the specific part to the other side is a predetermined value and changes the shooting direction so that the specific part is on a vertical line with the center of the frame.

The controlling device determines the specific part of the subject so that an area ratio of one side of the subject divided along a horizontal line with the specific part to the other side is a predetermined value and changes the shooting direction so that the specific part is on a horizontal line with the center of the frame.

According to the present invention, the subject can be followed while its specific part that is different from its center position is in the frame. For example, when the person is followed, the head of the person is in the frame.

The above object can be achieved by providing an automatic following device that follows a subject by changing a shooting direction of a camera, the automatic following device comprising: a hue setting device that sets a hue of the subject to be followed; a moving subject abstracting device that abstracts moving subjects from images captured by the camera; a subject choosing device that chooses the subject to be followed among the moving subjects abstracted by the moving subject abstracting device according to the hue set by the hue setting device; and a controlling device that changes the shooting direction according to a position of the subject chosen by the subject choosing device.

According to the present invention, the subject to be followed is determined by the hue. Thus, only the subject can be appropriately followed even if there are a plurality of moving subjects in the frame.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 6 is a block diagram showing the structure of the pan head controller;

FIG. 7 is a flow chart showing automatic following according to a first embodiment;

FIGS. 17(A) and 17(B) are explanatory diagrams showing the automatic following according to the third embodiment;

FIGS. 20(A), 20(B), 20(C), 20(D) and 20(E) are explanatory diagrams showing the automatic following according to the fourth embodiment.

DETAILED DESCRIPTION OF THE PREFERRED EMBODIMENT

This invention will be described in further detail by way of example with reference to the accompanying drawings.

Figure 1:
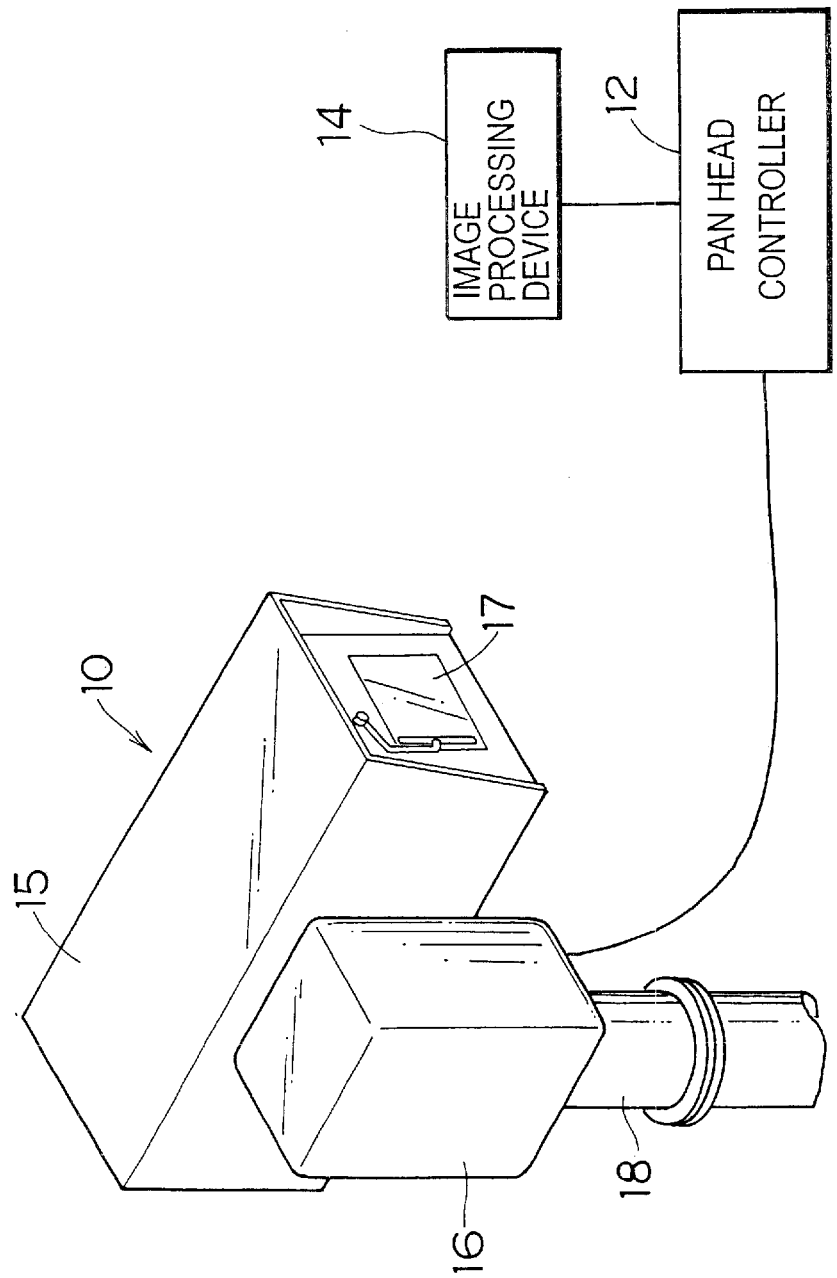
FIG. 1 is a diagram showing the whole structure of a pan head system according to the embodiment of the present invention.

FIG. 1 is a diagram showing the whole structure of a pan head system according to the embodiment of the present invention. The pan head system comprises a pan head 10, a pan head controller 12 and an image processing device 14. The pan head 10 comprises a housing 15 that contains a TV camera, and a pan head body 16 that pans and tilts the housing 15. A transparent cover glass 17 is provided on the front of the housing 15, and the camera shoots an image of outside the housing 15 through the cover glass 17.

The housing 15 is supported on a tilt shaft (not shown) extended from the pan head body 16, and the tilt shaft is rotated by a tilt motor built in the pan head body 16. The pan head body 16 is supported on a pan shaft 18 fixed on a base (not shown), and the pan shaft 18 is rotated by a pan motor built in the pan head body 16. Driving the pan motor and the tilt motor built in the pan head body 16 pans and tilts the camera contained in the housing 15 to change a shooting direction of the camera.

The pan head controller 12 is connected to the pan head 10 through a cable (the pan head controller 12 may be connected through a communication circuit such as a private circuit and a public circuit), and the pan head controller 12 transmits a control signal to the pan head 10 according to operation of operating members provided on the pan head controller 12 to control the pan head 10 and the camera mounted in the pan head 10. As shown in the plan view of FIG. 2, the pan head controller 12 has a joy stick 20, a focusing knob 22 and a zooming knob 23, and operating the joy stick 20 forward or backward and to the left or right pans and tilts the housing 15 (and the camera) of the pan head 10. Operating the focusing knob 22 and the zooming knob 23 performs the focusing and the zooming of the camera (a lens device of the camera), respectively.

The pan head controller 12 also has a memo switch 24, three page switches 28, ten shot switches 30 and the like for the presetting function. In the presetting function, shooting conditions that are a panning position, a tilting position, a zooming position and a focusing position are set to register a desired shooting in advance, and when one of the shot switches 30 is pressed, the shooting is automatically performed.

When a shooting is to be registered, the memo switch 24 is pressed and the pan head controller 12 enters the registration mode, and the joy stick 20, the focusing knob 22 and the zooming knob 23 are operated to set desired shooting conditions. Then, one of the Nos. 1–10 shot switches 30 is pressed, and the shooting conditions are stored in a built-in memory as shooting data of the pressed shot switch 30.

The page switches 28A, 28B and 28C are provided for three pages A, B and C, and each page has up to ten shootings, enabling thirty shootings to be registered in total. When the shooting is registered, all of the panning position, the tilting position, the zooming position and the focusing position are not necessarily stored, and only the panning position, the tilting position and the zooming position may be stored, and panning position and the tilting position or the zooming position may be stored.

When a registered shooting is to be performed, one shot switch 30 for the desired shooting is pressed while the memo switch 24 is off. Then, the shooting data is read from the memory of the pan head controller 12, and the control signal indicating the panning position, the tilting position, the zooming position and the focusing position is transmitted to the pan head 10. The housing 15 of the pan head 10 is panned and tilted and the camera is zoomed and focused according to the control signal. Operating a speed knob 32 changes the operating speed at the shooting in the presetting function.

The pan head controller 12 also has an automatic following switch 26 for the automatic following function. The automatic following function follows a moving subject in the field of view. In the present invention, the shooting is sequentially switched between the shootings registered in the presetting function according to the position of the subject to be followed so that the subject is in the field of view. In the conventional method, the camera is arbitrary moved according to the position of the subject. In the present invention, the zooming position and the focusing position as well as the panning position and the tilting position are changed according to the position of the subject. The position of the subject to be followed is determined by the image processing device 14 and inputted to the pan head controller 12. The image processing device 14 will be explained in detail.

Figure 3:
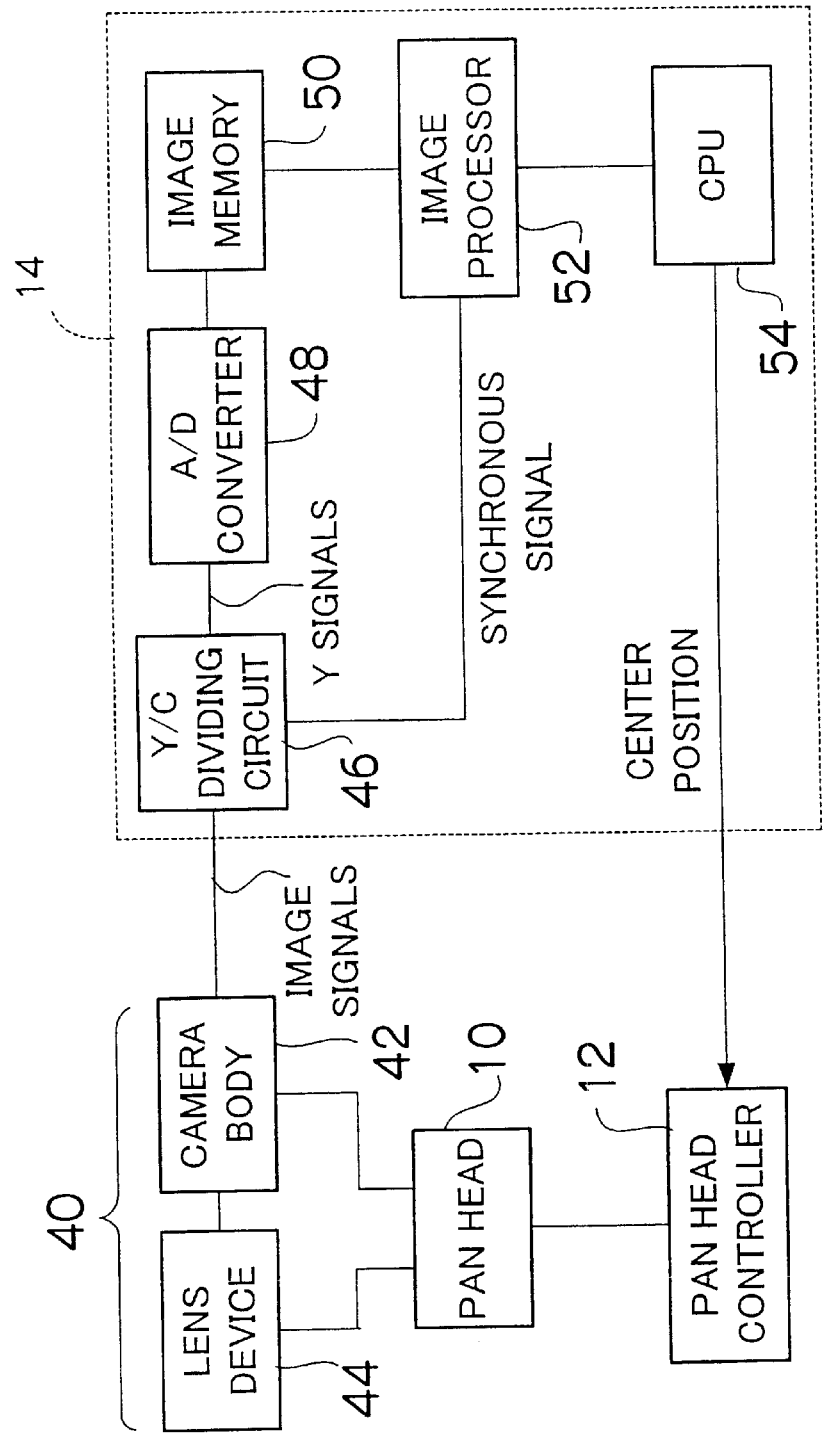
FIG. 3 is a block diagram showing the structure of the pan head system, and mainly showing the structure of an image processing device.
Figure 4:
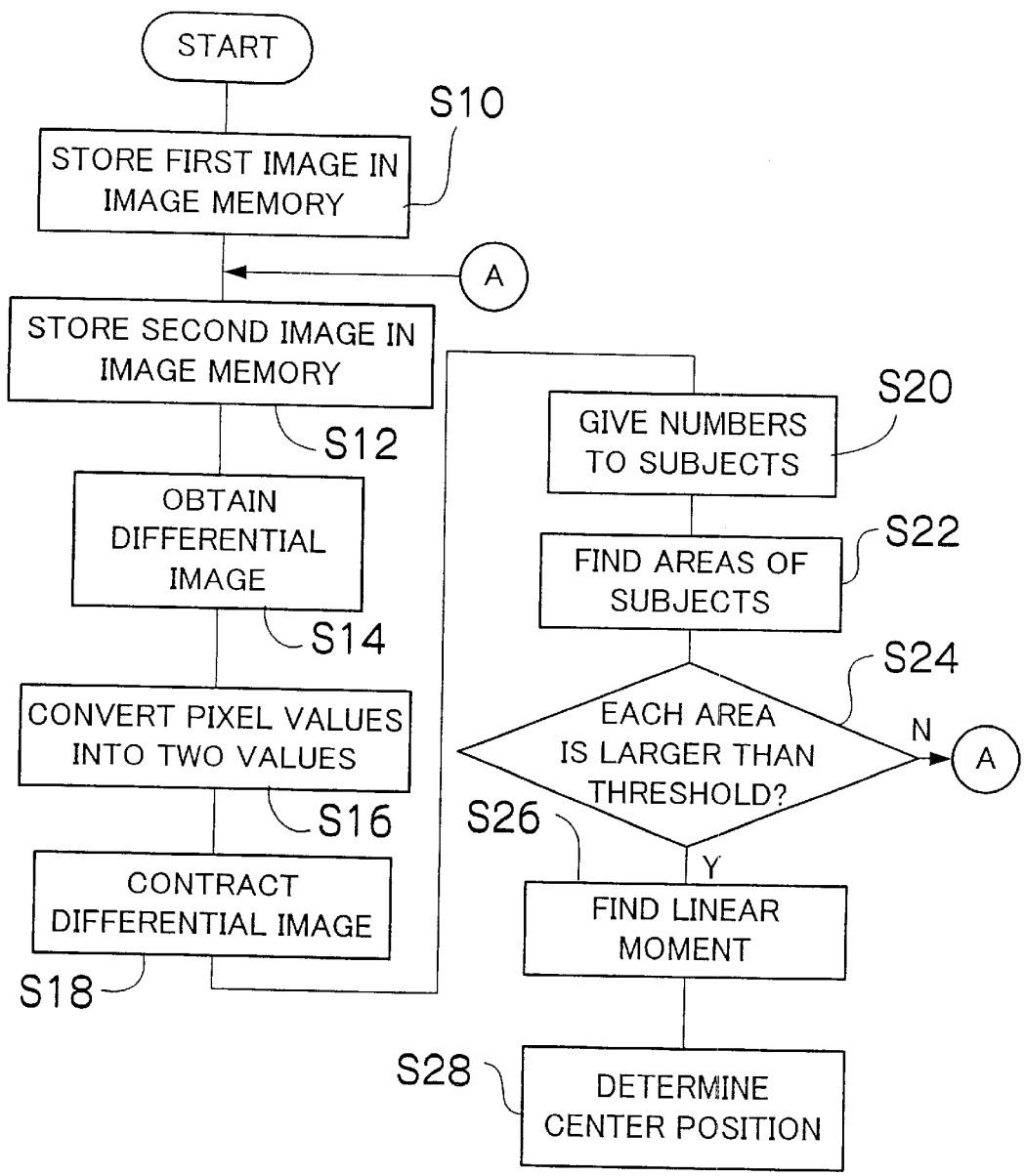
FIG. 4 is a flow chart showing a processing of the image processing device.

FIG. 3 is a block diagram showing the structure of the pan head system, and mainly showing the structure of the image processing device 14. As shown in FIG. 3, the camera 40 contained in the housing 15 of the pan head 10 is composed of a camera body 42 and the lens device 44 attached to the camera body 42. The camera body 42 has an imaging device and a processing circuit, and outputs an image (animation) captured by the imaging device to the outside as image signals. Shooting operation is controlled according to the control signal inputted from the pan head controller 12 through the pan head 10.

The lens device 44 has optical members including a focusing lens and a zooming lens that can be moved by motors, movement of the focusing lens and the zooming lens focuses and zooms the camera 40. The operation of the lens device 44 such as focusing and zooming is controlled according to the control signal inputted from the pan head controller 12.

The pan head 10 moves the housing 15 according to the control signal inputted from the pan head controller 12 to pan and tilt the camera 40, and transmits the control signal inputted from the pan head controller 12 for controlling the camera body 42 or the lens device 44 to the camera body 42 or the lens device 44.

The image processing device 14 effectively operates when the automatic following switch 26 of the pan head controller 12 is on and the pan head controller 12 is in the automatic following mode. As shown in FIG. 3, the image processing device 14 comprises a Y/C dividing circuit 46, an image memory 50, an image processor 52 and a CPU 54. The Y/C dividing circuit 46 divides the image signals outputted from the camera body 42 of the camera 40 into luminance signals (Y signals) and chroma signals to abstract only the Y signals. The abstracted Y signals are converted into digital signals (image data) by an A/D converter 48. The image memory 50 stores image data for two frames outputted from the Y/C dividing circuit 46.

The image processor 52 stores the image data for the two frames in the image memory 50 according to synchronous signal inputted from the Y/C dividing circuit 46 in synchronization with the image signals, and performs a processing for determining a center position of the subject to be followed according to the stored image data.

The CPU 54 determines the center position from the result of the processing by the image processor 52, and informs the pan head controller 12 of the center position. The CPU 54 also performs a needed processing. If the CPU 54 informs the pan head controller 12 of the center position when the pan head controller 12 is in the automatic following mode, the pan head controller 12 controls the automatic following in the way that will be explained later according to the center position.

A first embodiment of the automatic following will now be explained.

Figure 5:
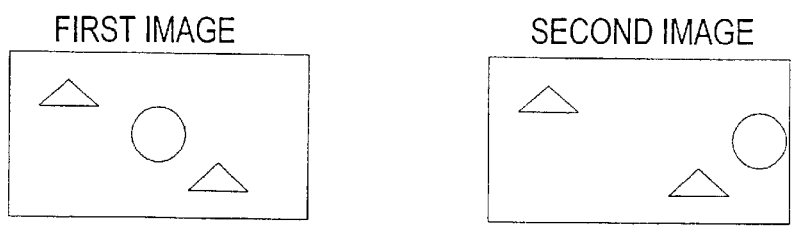
FIGS. 5(A), 5(B), 5(C), 5(D) and 5(E) are explanatory diagrams showing the processing of the image processing device.
Figure 5:
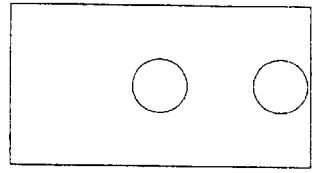
Figure 5:
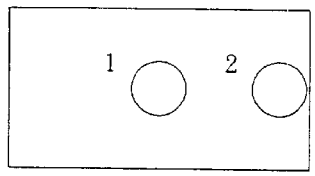
Figure 5:
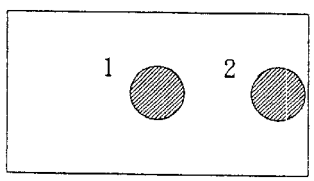
Figure 5:
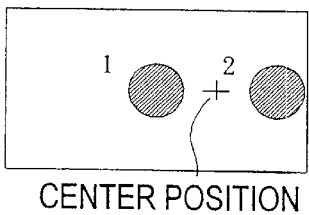

The processing of the image processing device 14 will now be explained with reference to a flow chart of FIG. 4 and FIGS. 5(A), 5(B), 5(C), 5(D) and 5(E). The image processor 52 stores image data for one frame (first image) in the image memory 50 from the camera body 42 of the camera 40 through the Y/C dividing circuit 46 and the A/D converter 48 (step 10). A predetermined time later, the image processor 52 stores image data for one frame (second image) in the image memory 50 (step 12). FIG. 5(A) shows the first image and the second image, and subjects denoted by triangles stand still and a subject denoted by a circle is moving.

Then, the image processor 52 obtains a differential image between the first image and the second image (step 14). At step 14, the image processor 52 finds a difference between values of each pixel of the images, and finds the absolute value of the difference for each pixel to abstract only the image data of the moving subject. FIG. 5(B) shows the differential image between the first image and the second image in FIG. 5(A), and only the image data of the subject denoted by the circle is abstracted. Thus, the subject denoted by the circle is to be followed.

Next, the image processor 52 converts the values of the pixels of the differential image into two values (step 16). Ideally, the values of the pixels of the moving subject are 1 and the other values are 0. Then, the image processor 52 contracts the binary differential image to eliminate small noise components (step 18). Next, the image processor 52 gives a number to each subject considered to be integrated (step 20). FIG. 5(C) shows the subjects with the numbers 1 and 2 in the binary differential image.

Then, the image processor 52 finds an area of each subject with a number (step 22). The subjects with the numbers are denoted by diagonal lines in FIG. 5(D). The areas of the subjects are inputted from the image processor 52 to the CPU 54, which compares the areas with a predetermined threshold to abstracts only the subjects whose areas are larger than the threshold (step 24). Therefore, the subjects whose areas are smaller than the threshold and the subjects whose motions are small are eliminated. If there is no subject whose areas are larger than the threshold, the processing returns to step 12. Suppose the No. 1 subject and the No. 2 subject in FIG. 5(D) are large enough and abstracted by the CPU 54.

Then, the image processor 52 finds a linear moment of the abstracted subjects with the numbers (step 26), and determines the center position of the subjects (step 28). FIG. 5(E) shows the center position of the No. 1 subject and the No. 2 subject by a plus sign. The CPU 54 outputs the center position to the pan head controller 12 as the position of the subject to be followed. The pan head controller 12 switches the shooting conditions such as the panning position, the tilting position, the zooming position and the focusing position according to the center position. After this operation, the processing returns to step 10.

Figure 2:
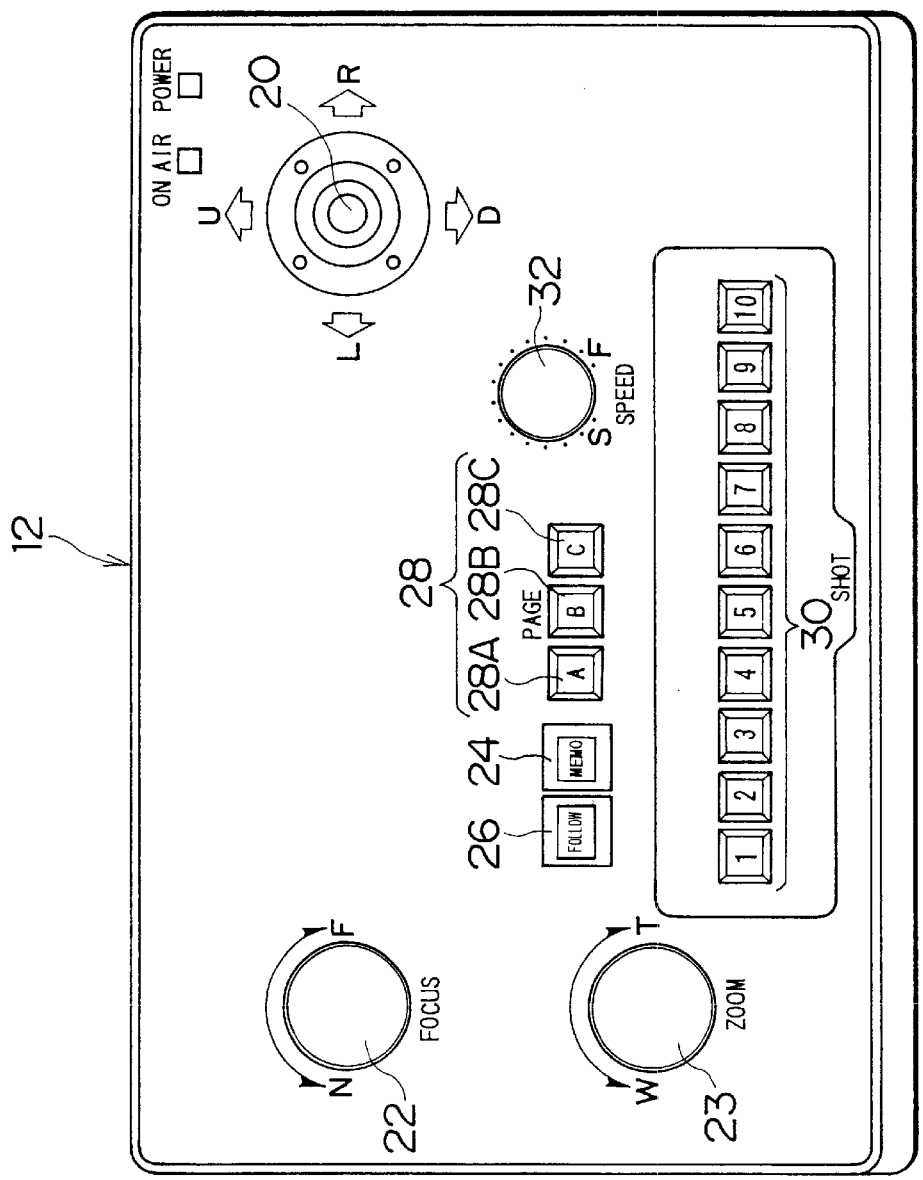
FIG. 2 is a plan view showing operating members of a pan head controller.

The structure and the processing of the pan head controller 12 will now be explained. FIG. 6 is a block diagram showing the structure of the pan head controller 12. A CPU 60 in FIG. 6 transmits the control signal for panning and tilting the camera 40 and the control signal for zooming and focusing the camera 40 to the pan head 10 according to the operation of an operating part 62 composed of the operating members in FIG. 6. If the memo switch 24 in FIG. 2 is turned on and one of the shot switches 30 is pressed for registering shooting conditions, the panning position, the tilting position, the zooming position and the focusing position (position signals) are outputted from the pan head 10 to the CPU 60, which stores the positions in a memory 64 at the address corresponding to the pressed shot switch 30. If one of the shot switches 30 is pressed for performing a shooting under registered conditions when the memo switch 24 is off, the CPU 60 reads the shooting data corresponding to the pressed shot switch 30 and transmits the control signal for the shooting to the pan head 10.

If the automatic following switch 26 is pressed and the pan head controller 12 enters the automatic following mode, the pan head controller 12 performs the automatic following according to the center position inputted from the image processing device 14.

Figure 8:
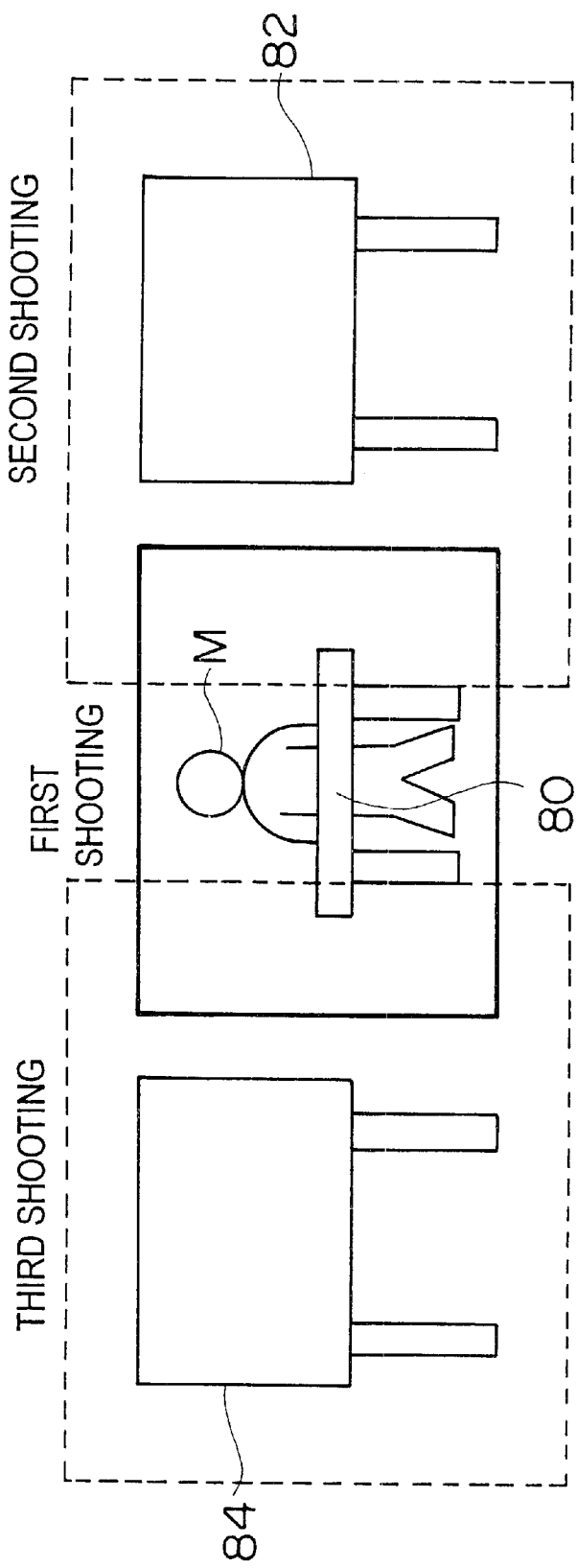
FIG. 8 is an explanatory diagram showing the automatic following according to the first embodiment.

The automatic following will now be explained with reference to a flow chart of FIG. 7 and FIGS. 8, 9 and 10. First, desired shootings are registered in the memory 64 in the presetting function before the start of the automatic following (step 50). Suppose, as shown in FIG. 8, a table 80 is in the center of a studio and panels 82 and 84 or the like are on both sides of the table 80, and a newscaster M is to be shot in the automatic following mode, and a shooting (a first shooting) for the table 80 and shootings (a second shooting and a third shooting) for the panels 82 and 84 are registered in the memory 64 in the presetting function.

Then, the CPU 60 finds a position of the frame for each shooting according to the panning position, the tilting position and the zooming position, and stores the position with the shooting data in the memory 64 (step 52). The position of the frame is recorded as a panning angle and a tilting angle, but ranges of the panning angle and the tilting angle within the frame may be recorded.

Next, a desired shooting is performed to set a desired frame in the presetting function (step 54). For example, the first shooting is performed with a frame denoted by a solid line in FIG. 8 to shoot, for as an example, the newscaster M at the table 80. The frame at the start of the shooting may be arbitrarily set according to the operation of the joy stick 20, the focusing knob 22 and the zooming knob 23. Then, the automatic following switch 26 is turned on to start the automatic following (step 56).

Figure 9:
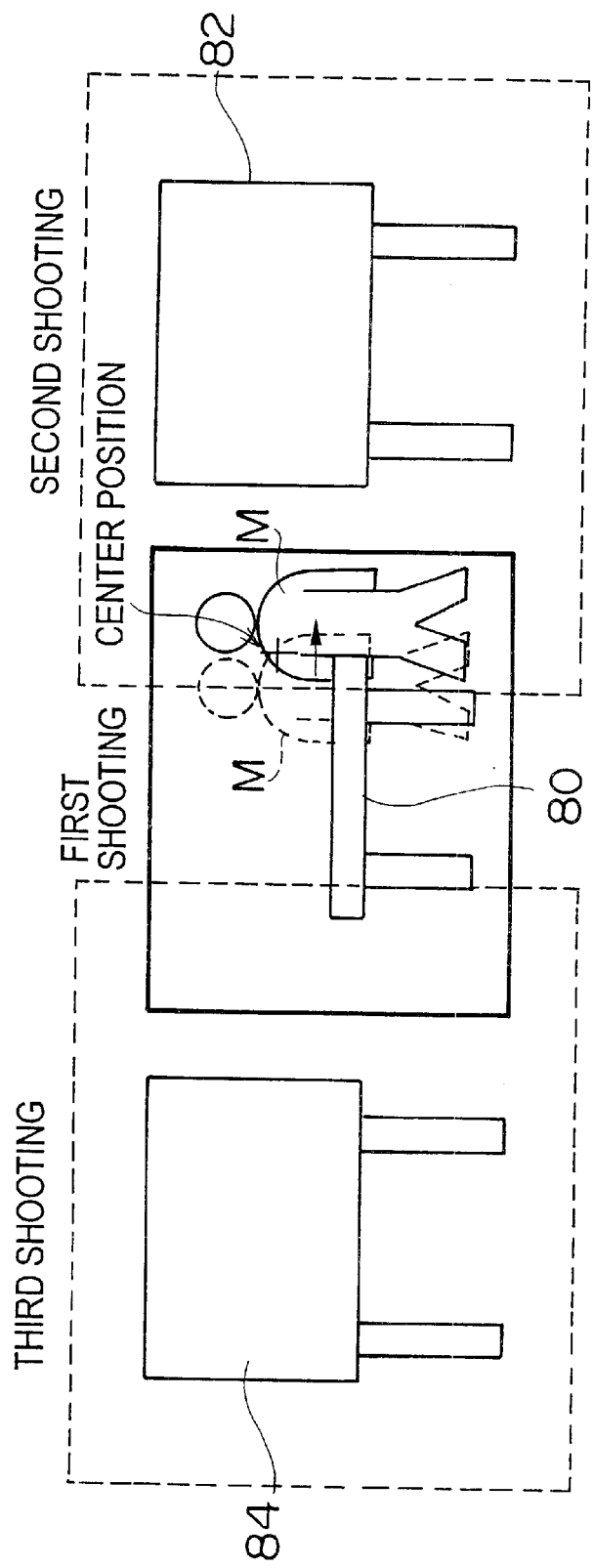
FIG. 9 is an explanatory diagram showing the automatic following according to the first embodiment.
Figure 10:
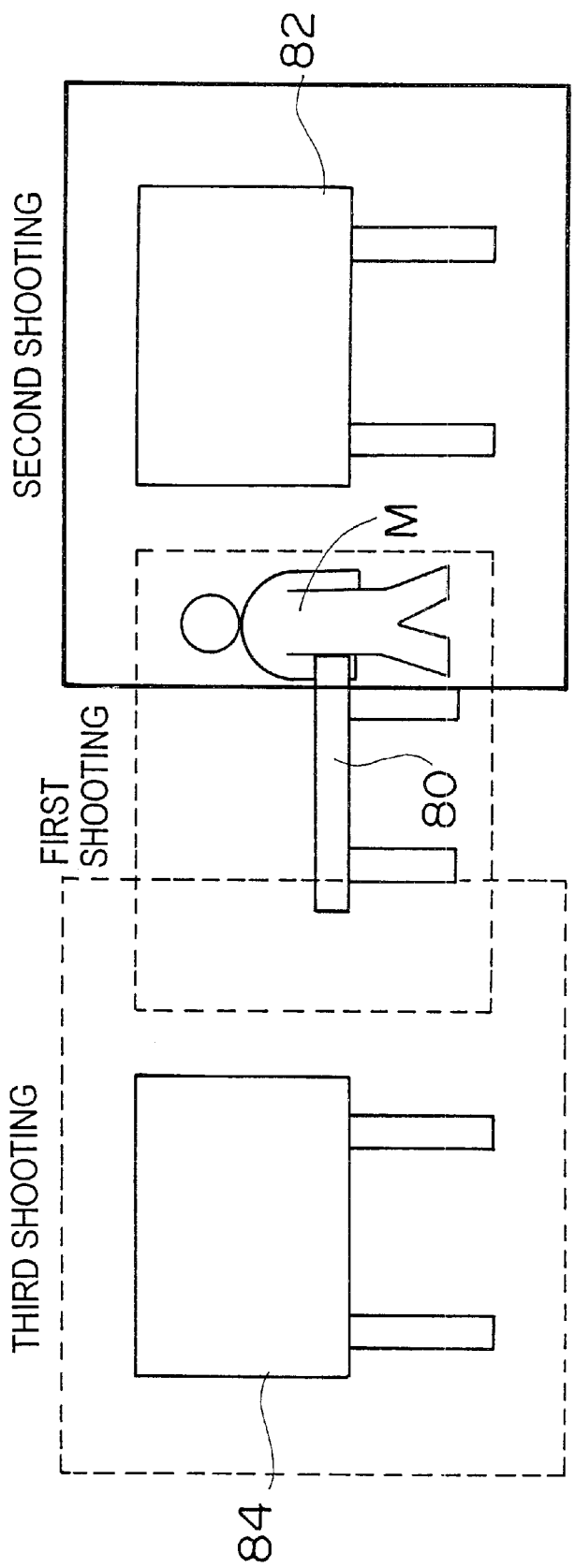
FIG. 10 is an explanatory diagram showing the automatic following according to the first embodiment.

After the start of the automatic following, the center position is inputted to the CPU 60 from the image processing device 14 (step 58). Then, the CPU 60 determines whether any other frame recorded in the memory 64 includes the center position or not according to the center position and the positions of the frames recorded in the memory 64 (step 60). If NO, the processing returns to step 58. If YES, the CPU 60 transmits the control signal for the shooting with the frame to the pan head 10, and the shooting is switched so that the moving subject is within the field of view (step 62). Suppose, as shown in FIG. 9, the newscaster M moves to the right after the start of the automatic following. The center position inputted from the image processing device 14 shifts to the right. When the center position denoted by the plus sign gets in the frame for the second shooting, the CPU 60 transmits the control signal for the second shooting to the pan head 10 and the second shooting is started with a frame denoted by a solid line in FIG. 10.

Since the shooting is switched only to another shooting registered in the memory 64, the panning position, the tilting position, the zooming position and the focusing position do not change even if the subject to be followed moves a little within the field of view. Therefore, the image shot by the camera 40 is not blurred. Also, since the desired zooming position as well as the panning position and the tilting position can be stored as the shooting conditions, the shooting is performed with an appropriate view angle according to the panning position and the tilting position.

In the above explanation, the shooting is switched when the center position gets in the frame for another shooting, but the shooting may be switched anytime as long as the subject to be followed is in the field of view. For example, a shooting in which the center of the frame may be closest to the center position may be chosen among shootings whose frames include the center position abstracted from the shootings registered in the memory 64 to switched the present shooting to the chosen shooting if the chosen shooting is different from the present shooting. Also, in case centers of a plurality of frames are closed to the center position, the present shooting may be switched to the shooting with the smallest view angle. In this case, even if a plurality of shootings with the same panning positions and tilting positions and the different zooming positions (view angles) are registered in the memory 64, only the zooming position is changed according to the center position to switch to the appropriate shooting so that the subject is in the field of view. If it is determined that the center position is shifting outside of the frame in a determining area set along the frame, the present shooting is switched to another shooting whose frame includes the center position. Also, if it is determined that the center position is shifting outside of the frame in an area that is included in the frame of the present shooting and that of another shooting, the present shooting may be switched to the shooting.

The panning position, the tilting position, the zooming position and the focusing position are stored as the shooting data in the embodiment, but only the panning position and the tilting position or the zooming position may be stored.

In addition, the TV camera is used in the embodiment, but the present invention is not limited to this, and a still camera (for example, a digital still camera) may be used.

A second embodiment of the automatic following will now be explained.

When the pan head controller 12 is not in the automatic following mode, it transmits the control signal to the pan head 10 according to the operation of the operating members of the pan head controller 12 to control the pan head 10 and the camera 40 mounted on the pan head 10. When the pan head controller 12 is in the automatic following mode, it transmits the control signal for the panning and the tilting to the pan head 10 according to the center position inputted from the CPU 54 of the image processing device 14 to change the shooting direction of the camera 40 so that the center position is the center of the frame.

Figure 11:
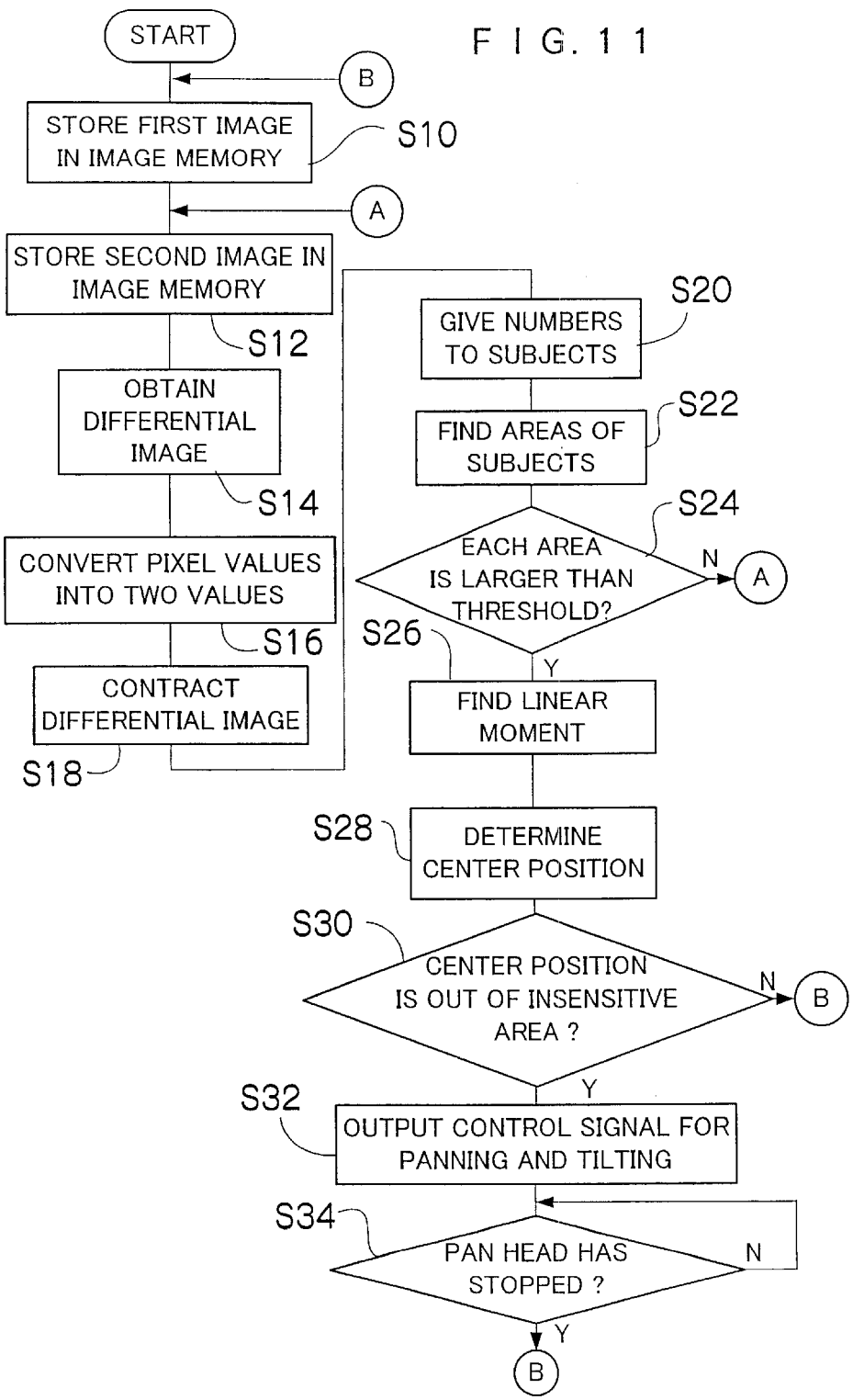
FIG. 11 is a flow chart showing automatic following according to a second embodiment.

The processing of the image processing device 14 will now be explained with reference to a flow chart of FIG. 11 and FIGS. 5(A)–5(E). Steps 10–28 in FIG. 11 are the same as those in FIG. 4, and they will not be explained. The center position determined at step 28 is represented by the assumed ordinate and abscissa on the frame.

Figure 12:
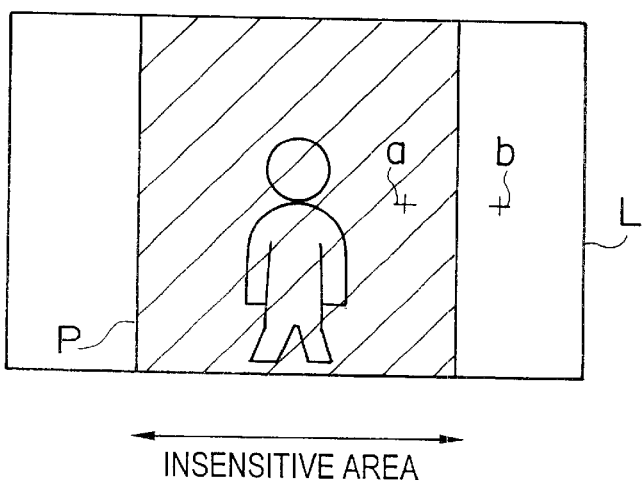
FIG. 12 is an explanatory diagram showing an insensitive area.

Then, the CPU 54 determines whether or not the center position is out of an insensitive area (step 30). The insensitive area P denoted by diagonal lines in FIG. 12 is set with a predetermined width in the center of the frame L. If the center position is a point a in the insensitive area P, the CPU 54 determines NO at step 30 and returns to step 10 without outputting the center position to the pan head controller 12. Thus, the shooting direction does not change.

On the other hand, if the center position is a point b out of the insensitive area P, the CPU 54 determines YES at step 30 and outputs the center position to the pan head controller 12.

The present panning position, tilting position and zooming position (focusing position) are outputted from the pan head 10 to the pan head controller 12. If the CPU 54 outputs the center position to the pan head controller 12, the pan head controller 12 finds the panning position and the tilting position according to the panning position, the tilting position and the zooming position (focusing position) so that the center position is the center of the frame, and transmits the control signal indicating the panning position and the tilting position to the pan head 10 to change the shooting direction (step 32).

The present panning position and tilting position are outputted from the pan head controller 12 to the CPU 54, which determines whether or not the panning and the tilting have been stopped according as the panning position and the tilting position have changed (step 34). If YES, the CPU 54 returns to step 10.

The insensitive area P in FIG. 12 is set on the assumption that the subject to be followed mainly moves horizontally and the automatic following function does not vertically follow the subject or the tilting position is changed so that the center position is the vertical center of the frame. If the insensitive area P is also limited to the vertical center of the frame, the subject can be followed vertically as well as horizontally.

As described above, the insensitive area P is set in the frame, and when the center position is in the insensitive area, the shooting direction is not changed, and if the center position is out of the insensitive area, the shooting direction is changed so that the center position is the center of the frame. Therefore, the camera 40 does not pan and tilt even if the subject moves a little in the frame, and the image is not blurred.

Figure 13:
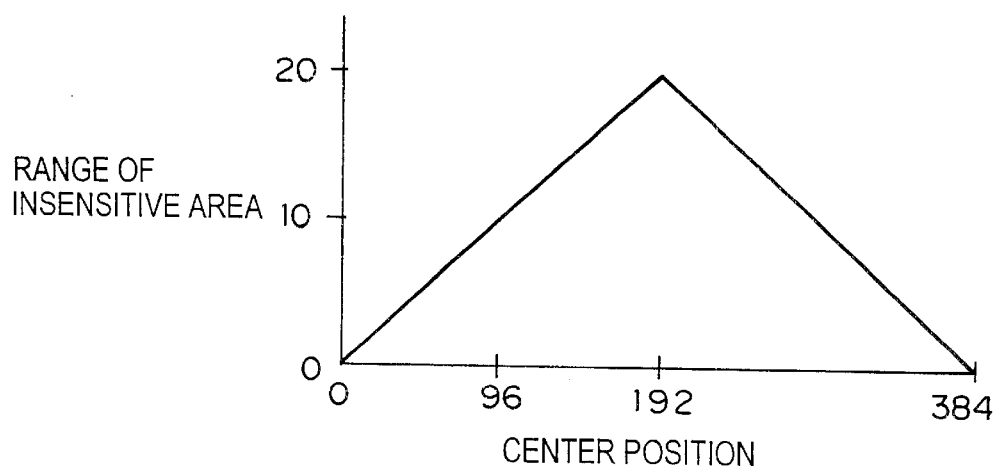
FIG. 13 is a graph diagram showing a method of determining a range of the insensitive area.

Another method of setting the insensitive area will now be explained. This method is different from the above-described method in that the insensitive area is set according to the center position determined first at step 28 in FIG. 11. FIG. 13 is a graph diagram showing the method of setting the insensitive area, and it shows the relationship between the range of the insensitive area and the first center position. The insensitive area is set on the assumption that the subject to be followed mainly moves horizontally, but it may be limited vertically as well as horizontally.

The horizontal position of the frame is represented by 0 through 384. If the first center position is 192 (the center of the frame), the range of the insensitive area is 20 (maximum). In this case, the CPU 54 of the image processing device 14 does not output the center position to the pan head controller 12 so that the camera 40 does not pan and tilt until the center position horizontally shifts 20. If the center position horizontally shifts 20, the CPU 54 outputs the center position to the pan head controller 12 to change the shooting direction.

The farther the center position is from the center of the frame, the smaller the range of the insensitive area is. If the first center position is 96, the range of the insensitive area is 10. In this case, the CPU 54 of the image processing device 14 does not output the center position to the pan head controller 12 not to pan and tilt the camera 40 until the center position horizontally shifts 10. If the center position horizontally shifts 10, the CPU 54 outputs the center position to the pan head controller 12 to change the shooting direction. As described above, the farther the center position determined first after the panning and the tilting of the camera 40 in the automatic following is from the center of the frame, the smaller the range of the insensitive area is. Therefore, the subject never goes out of the frame to be followed. The insensitive area is set according to the first center position in the embodiment, but if the center position determined after the first center position is determined is in the insensitive area set according to the first center position, the insensitive area may be reset, and if the center position determined after the reset of the insensitive area is in the insensitive area, the insensitive area may be reset according to the center position.

The shooting direction is changed to follow the subject in the embodiment, but the view angle (zooming position) as well as the shooting direction may be changed.

In addition, the TV camera is used in the embodiment, but the present invention is not limited to this, and a still camera (for example, a digital still camera) may be used.

A third embodiment of the automatic following will now be explained.

Figure 14:
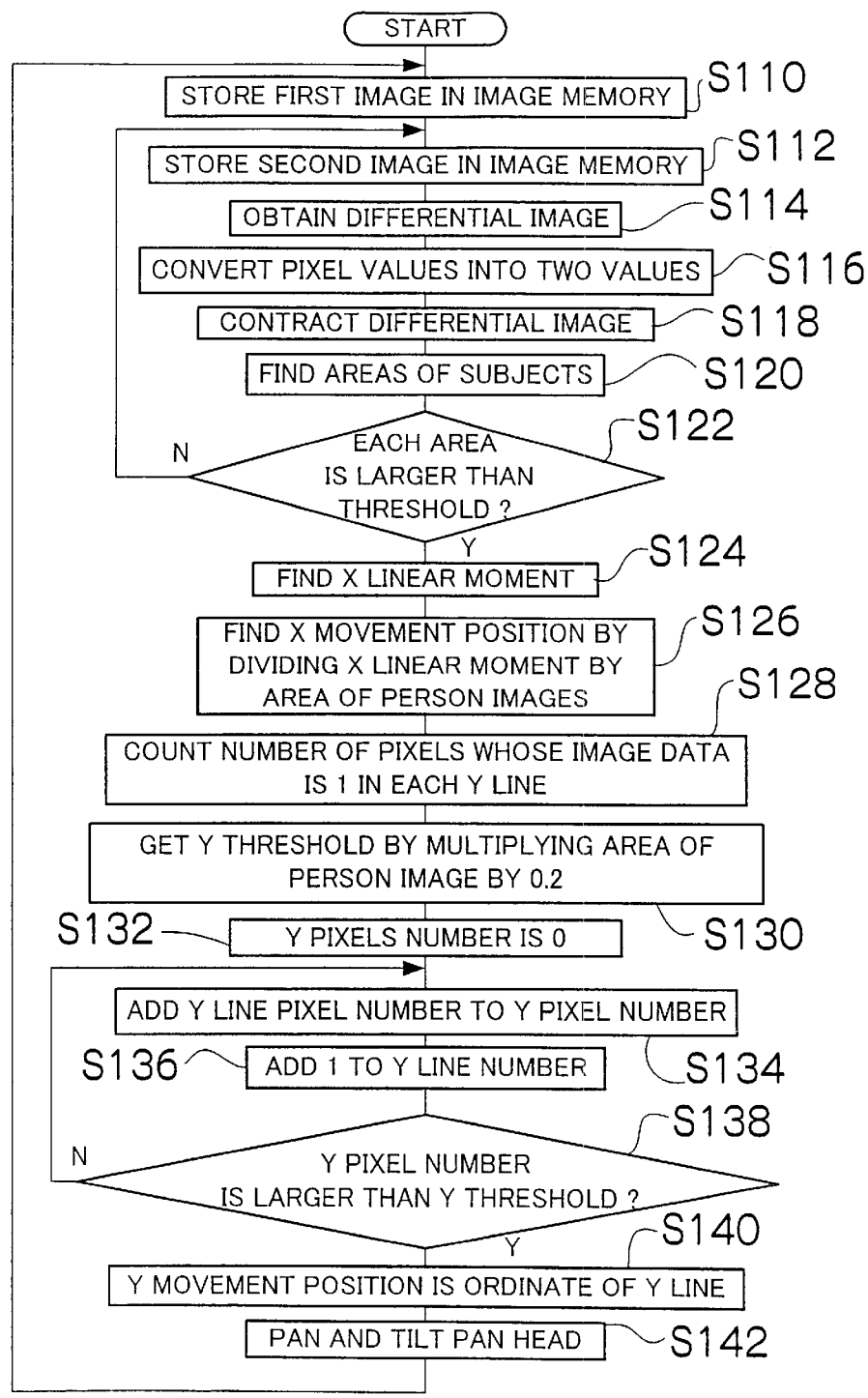
FIG. 14 is a flow chart showing automatic following according to a third embodiment.

A specific part of the subject to be followed is the center of the frame, and in the embodiment, a person is followed in such a manner that the head of the person is the center of the frame. The automatic following will now be explained with reference to a flow chart of FIG. 14 and explanatory diagrams of FIGS. 15(A), 15(B), 15(C), 15(D) and 16.

Figure 15A:
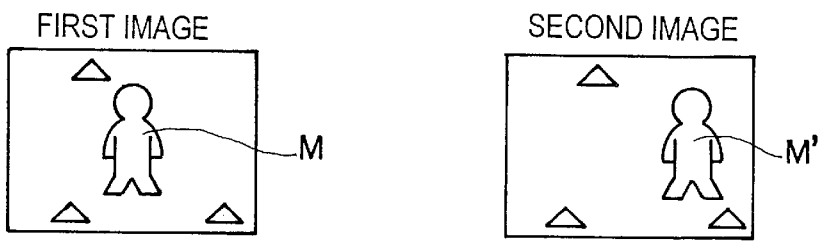
FIGS. 15(A), 15(B), 15(C) and 15(D) are explanatory diagrams showing the automatic following according to the third embodiment.

The image processor 52 stores image data for one frame (first image) in the image memory 50 from the camera body 42 of the camera 40 through the Y/C dividing circuit 46 and the A/D converter 48 (step 110). A predetermined time later, the image processor 52 stores image data for one frame (second image) in the image memory 50 (step 112). FIG. 15(A) shows the first image and the second image, and the person (person images M and M') that is the subject to be followed is moving, and subjects denoted by triangles stand still.

Figure 15B:
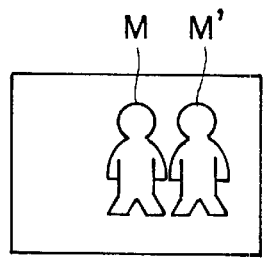
Figure 15C:
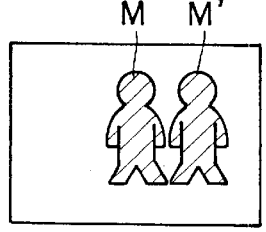

Then, the image processor 52 obtains a differential image between the first image and the second image (step 114). At step 114, the image processor 52 finds a difference between values of each pixel of the images, and finds the absolute value of the difference for each pixel to abstract only the image data of the moving subject. FIG. 15(B) shows the differential image between the first image and the second image in FIG. 15(A), and only the image data (the person image M in the first image and the person image M' in the second image) of the subject denoted by the circle is abstracted. Thus, the person is considered to be the subject to be followed.

Next, the image processor 52 converts the values of the pixels of the differential image into two values (step 116). Ideally, the values of the pixels of the moving person are 1 and the other values are 0. Then, the image processor 52 contracts the binary differential image to eliminate small noise components (step 118).

Then, the image processor 52 finds an area of the person images by counting the number of the pixels whose image data is 1 (step 120). The person images are denoted by diagonal lines in FIG. 15(C).

The area of the person images is inputted from the image processor 52 to the CPU 54, which determines whether or not the area is larger than a predetermined threshold (step 122). If NO (a small subject is moving or the motion of the person is small), the processing returns to step 112.

Figure 15D:
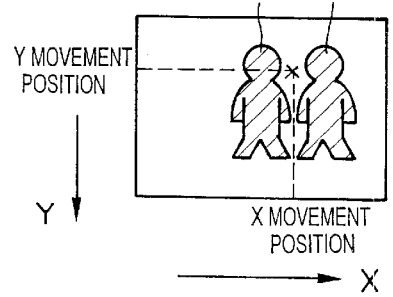

If YES at step 122, the image processor 52 and the CPU 54 find the position of the head of the person from the differential image. Since it is assumed that the person moves only horizontally (X direction), the abscissa of the head of the person is the horizontal center of the frame. Thus, the abscissa of the head of the person is the abscissa of the center position of the person images. First, the image processor 52 finds an X linear moment of the person images (part whose image data is 1) of the differential image (step 124). At step 124, the abscissas of the pixels whose image data is 1 are added up. The coordinates are arbitrarily set. Next, the CPU 54 finds the X center position by dividing the X linear moment by the area of the person images found at step 120 (step 126). The X center position is the X target point of the operation of the pan head at step 42, and the CPU 54 holds the center position as the X movement position. FIG. 15(D) shows the X movement position.

Figure 16:
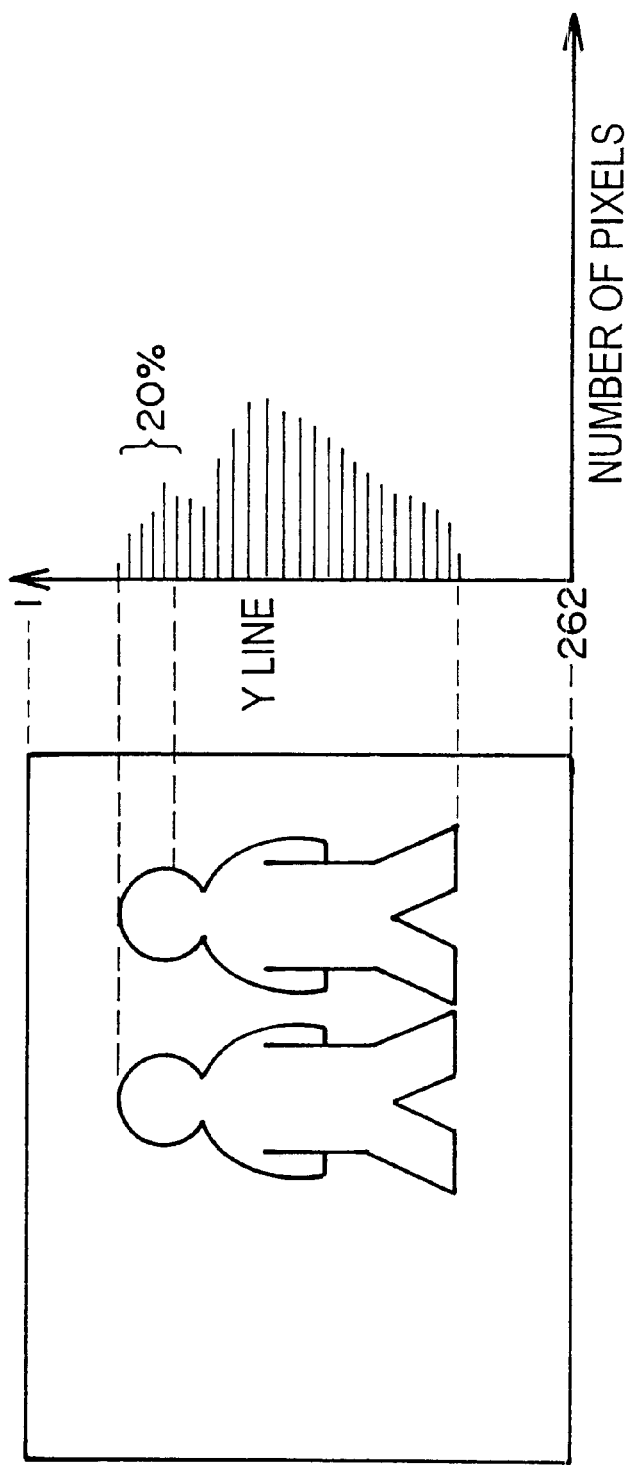
FIG. 16 is an explanatory diagram showing the automatic following according to the third embodiment.

Then, the image processor 52 and the CPU 54 find the vertical position (Y direction) of the head. The Y position of the head of the person images is determined in the following method so that 20 percent of the whole area of the person images is the area of the head (area ratio is 0.2). First, as shown in FIG. 16, the image processor 52 counts the number of pixels whose image data is 1 (person images) in each line of Nos. 1–262 horizontal lines (Y lines) (step 128). The data is outputted to the CPU 54, which gets a Y threshold by multiplying the area of the person image (total number of the pixels whose image data is 1) found at step 120 by 0.2 (step 130).

Next, the CPU 54 sequentially adds up the numbers (Y line pixel numbers) of the pixels found at step 128 from the No. 1 Y line to determine the Y line in which the added value is the Y threshold. First, the initial value of the Y pixel number is 0 and the initial value of the Y line number is 1 (step 132), and the CPU 54 adds the Y line pixel number to the Y pixel number (step 134). Then, the CPU 54 adds 1 to the Y line number (step 136).

The CPU 54 determines whether or not the Y pixel number is larger than the Y threshold (step 138). If NO, the processing returns to step 134. If YES, the ordinate of the Y line is the Y movement position that is the Y target point of the operation of the pan head at step 142 (step 140). FIG. 15(D) shows the Y movement position, and the target position for the center of the frame is denoted by an X.

Then, the CPU 54 outputs the X movement position found at step 126 and the Y movement position found at step 140 to the pan head controller 12, which outputs the control signal to the pan head 10 to pan and tilt the pan head 10 so that the target position is the center of the frame (step 142). After that, the processing returns to step 110.

The above processing is repeated to follow the moving person with the head being the center of the frame.

Though the head is away from the target position denoted by the X in FIG. 15(D), the person images M and M' are actually closer to each other than they are in FIG. 15(D) and the head is substantially at the target position.

The whole person is in the frame in FIGS. 15(A)–15(D), but the person can be followed with the head being the center of the frame by the above processing even if only a part of the person is in the frame. When the person M enters the frame, the person M starts being followed. If the head is not in the frame in this case, the position with the area ratio of 0.2 in the person image in the frame becomes the center of the frame by the first processing of steps 10–42. The processing is repeated to finally follow the person M with the head being the center of the frame as shown in FIG. 17(B).

The area ratio is not necessarily 0.2 in the embodiment, but the it may be another value. Also, the area ratio may be arbitrarily set.

The person is followed in the embodiment, but any moving subject may be followed. The area ratio is set so that the subject is followed with a desired part being the center of the frame. In case a car is to be followed with the license plate being the center of the frame, the area ratio is set at 0.8 or so.

The position whose ordinate is different from that of the center position of the person is the center of the frame in the embodiment, but a position whose abscissa is different from that of the center position may be the center of the frame.

The specific part of the subject is the center of the frame in the embodiment, but the specific part may be an arbitrary part of the frame. In this case, the X movement position found at step 126 and the Y movement position found at step 140 are increased or decreased by the differences between the abscissa and the ordinate of the center of the frame and those of the arbitrary part.

The area ratio is set to make the specific part of the subject be the center of the frame, but the method is not limited to this. For example, a position of the top of the subject in the frame when the specific part of the subject is the center of the frame is previously determined, and the number of the pixels (Y line pixel number) in each Y line is counted as shown in FIG. 16 to find the ordinate of the top of the subject. Whether or not the Y line pixel numbers are 0 (or a small value corresponding to 0) is sequentially determined from the No. 1 Y line, and the ordinate of the Y line in which the it was determined NO is found. Then, the shooting direction is changed so that the top of the subject is at a predetermined position in the frame. In case the head of the person is the specific part, the predetermined position at which the top of the head should be is above the center of the frame. The position of the bottom, the right end or the left end of the subject may be previously determined to make the specific part of the subject be the center of the frame in the same way.

The specific part of the subject is not necessarily the center of the frame. If the head of the person only needs to be in the frame, the person is followed in such a manner that the top of the person is at the predetermined position along the top edge of the frame.

In addition, the TV camera is used in the embodiment, but the present invention is not limited to this, and a still camera (for example, a digital still camera) may be used.

A fourth embodiment of the automatic following will now be explained.

Figure 18:
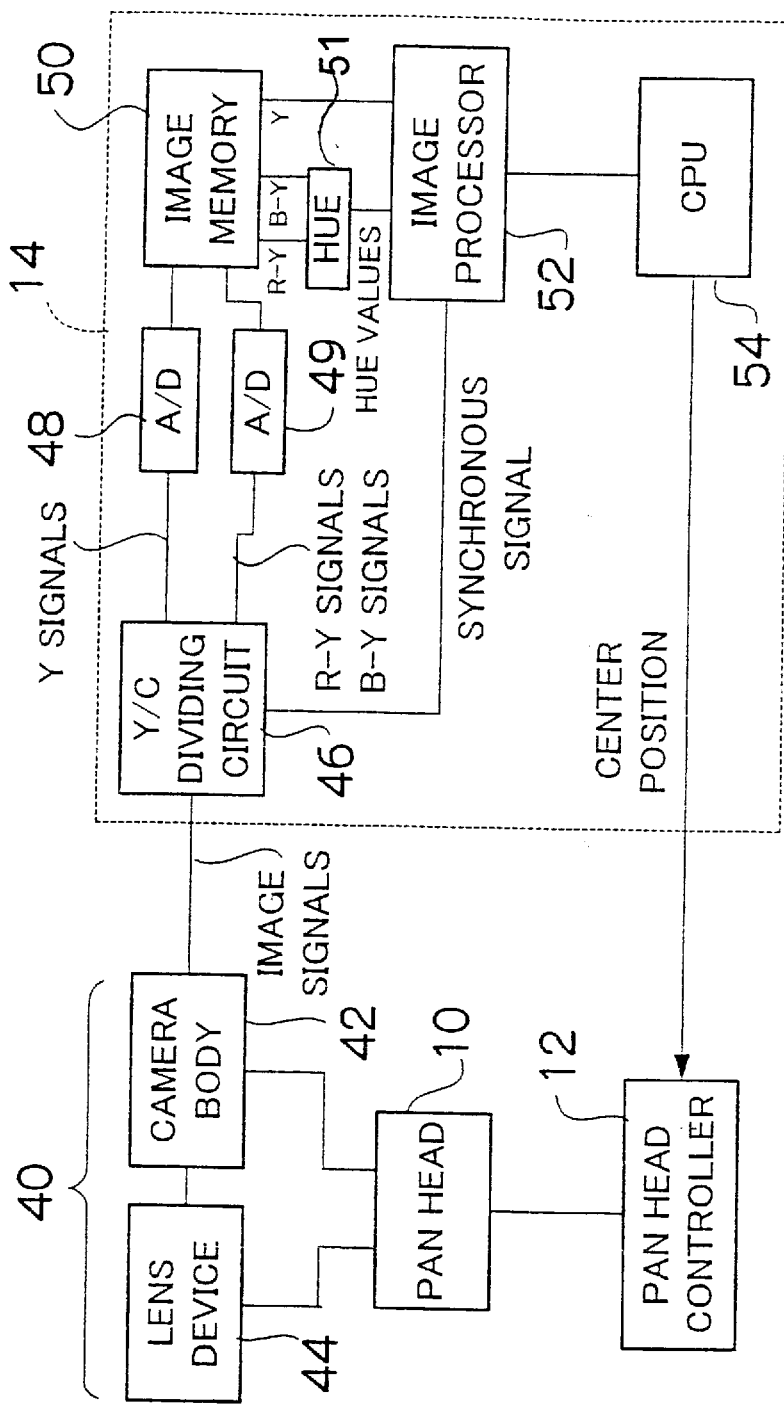
FIG. 18 is a block diagram showing the structure of a pan head system for automatic following according to a fourth embodiment.
Figure 19:
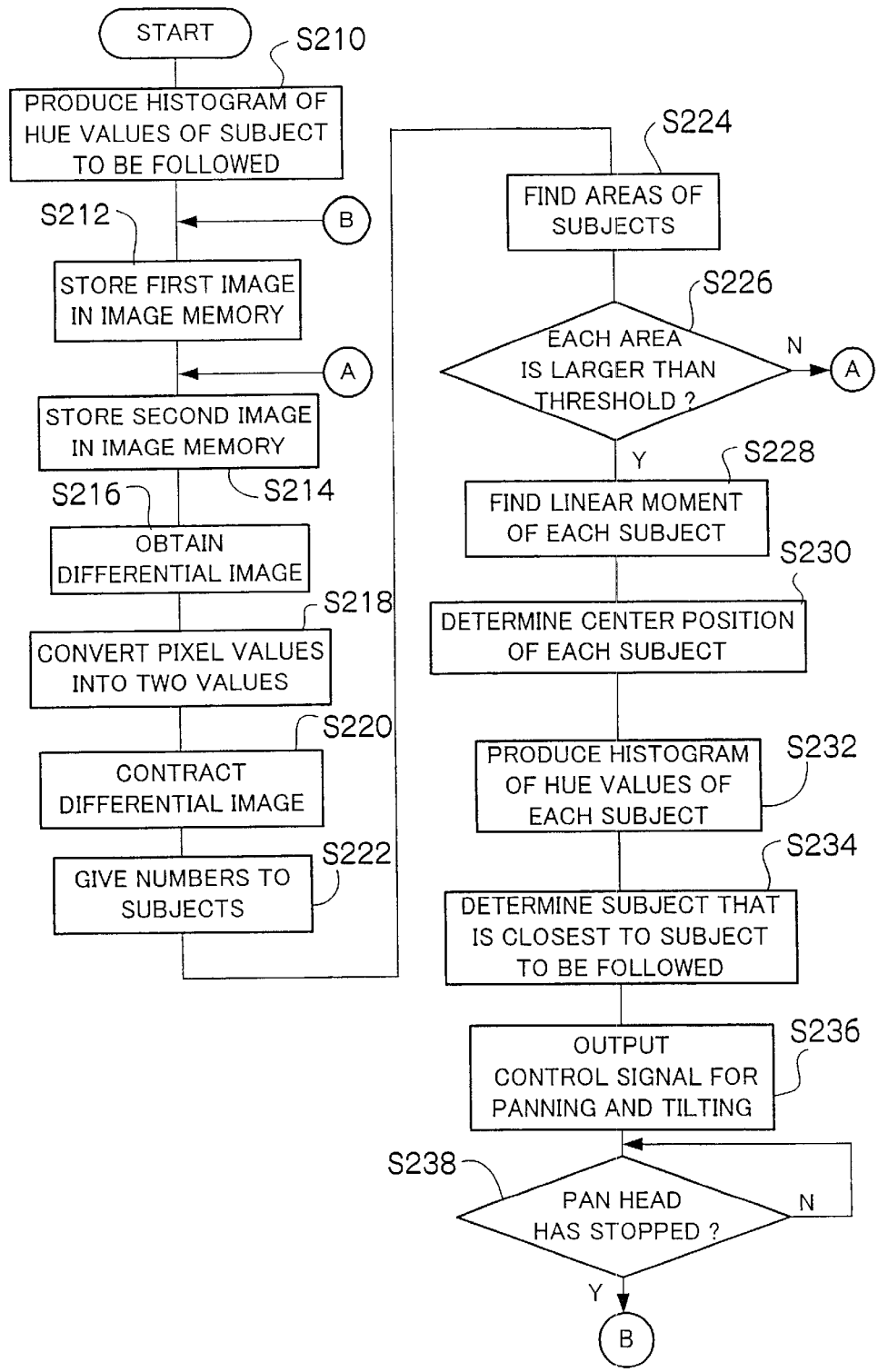
FIG. 19 is a flow chart showing the automatic following according to the fourth embodiment.

The image processing device 14 in FIG. 18 effectively operates when the pan head controller 12 is in the automatic following mode. As shown in FIG. 18, the image processing device 14 comprises the Y/C dividing circuit 46, the image memory 50, a HUE converting circuit 51, the image processor 52 and the CPU 54. The Y/C dividing circuit 46 divides the image signals outputted from the camera body 42 of the camera 40 into the luminance signals (Y signals) and the chroma signals (R-Y signals and B-Y signals). The luminance signals and the chroma signals are converted into digital signals (image data) by the A/D converter 48 and an A/D converter 49, respectively. The image memory 50 stores the image data of the luminance signals for two frames and the image data of the chroma signals for one frame.

The HUE converting circuit 51 reads the image data of the chroma signals for an area designated by the image processor 52, and converts the image data into data (HUE values) indicating hues. The HUE value (H) is calculated by the following equation 1, $$H = \tan^{-1}((B-Y)/(R-Y)) \qquad \text{equation 1,}$$

where (B−Y) and (R−Y) are values of the image data of the R−Y signal and the B−Y signal, respectively.

The image processor 52 stores the image data of the luminance signals for the two frames and the image data of the chroma signals for the one frame in the image memory 50 according to the synchronous signal inputted from the Y/C dividing circuit 46 in synchronization with the image signals, and performs a processing for determining the center position of the subject to be followed according to the stored image data of the luminance signals and the HUE values inputted from the HUE converting circuit 51.

The processing of the image processing device 14 will now be explained with reference to a flow chart of FIG. 19 and FIGS. 20(A), 20(B), 20(C), 20(D) and 20(E). First, before the start of the automatic following, the image processor 52 produces a histogram of the HUE values of the subject to be followed (step 210). At step 210, the camera 40 shoots the subject to be followed, and the image data for one frame is inputted to the image memory 50 of the image processing device 14 through the Y/C dividing circuit 46 and the A/D converter 48. The user makes the monitor display the image and designates the area of the subject to be followed with a mouse or the like. The image processor 52 obtains the HUE values of the pixels from the HUE converting circuit 51 according to the image data of the chroma signals stored in the image memory 50, and produces the histogram of the HUE values in the designated area. Then, the histogram is stored in a memory of the CPU 54.

When the pan head controller 12 enters the automatic following mode to start the automatic following, the image processor 52 stores image data of the luminance signals for one frame (first image) in the image memory 50 from the camera body 42 of the camera 40 through the Y/C dividing circuit 46 and the A/D converter 48 (step 212). At this time, the image data of the chroma signals is not stored.

A predetermined time later, the image processor 52 stores image data for one frame (second image) in the image memory 50 (step 214). At this time, the image data of the luminance signals and the chroma signals is stored. FIG. 20(A) shows the first image and the second image, and a subject denoted by a triangle stands still and subjects denoted by a square and a circle are moving. If the image processor 52 produces the histogram of the HUE values of the subject denoted by the square at step 210, the subject denoted by the square is to be followed.

Then, the image processor 52 obtains a differential image between the first image and the second image (step 216). At step 216, the image processor 52 finds a difference between values of each pixel of the images, and finds the absolute value of the difference for each pixel to abstract only the image data of the moving subjects. FIG. 20(B) shows the differential image between the first image and the second image in FIG. 20(A), and only the image data of the subjects denoted by the square and the circle are abstracted.

Next, the image processor 52 converts the values of the pixels of the differential image into two values (step 218). Ideally, the values of the pixels of the moving subjects are 1 and the other values are 0. Then, the image processor 52 contracts the binary differential image to eliminate small noise components (step 220). Next, the image processor 52 gives a number to each subject considered to be integrated (step 222). FIG. 20(C) shows the subjects with the numbers 1, 2, 3 and 4 in the binary differential image.

Then, the image processor 52 finds an area of each subject with a number (step 224). The areas of the subjects are inputted from the image processor 52 to the CPU 54, which compares the areas with a predetermined threshold to abstracts only the subjects whose areas are larger than the threshold (step 226). Therefore, the subjects whose areas are smaller than the threshold and the subjects whose motions are small are eliminated. If there is no subject whose areas are larger than the threshold, the processing returns to step 214.

Then, the image processor 52 finds a linear moment of each subject with a number (step 228), and determines the center positions of the subjects (step 230). The center positions are represented by their coordinates assumed on the frame. FIG. 20(D) shows the center positions of the Nos. 1–4 subjects by plus signs.

Next, the image processor 52 reads the image data of the chroma signals of the second image in the area of each subject with a number from the image memory 50, and finds the HUE values with the HUE converting circuit 51. Then, the image processor 52 produces a histogram of the HUE values in the area of each subject with a number (step 232), and determines the subject whose histogram is the closest to that produced at step 210 among the subjects with the numbers (step 234). For example, the histogram in which the numbers of the pixels are the largest around the HUE value at which the histogram produced at step 210 has the maximum number of the pixels is chosen. In case the subject denoted by the square is to be followed, the No. 1 subject is chosen as shown in FIG. 20(E) since the histogram is produced from the image data of the chroma signals of the second image.

The CPU 54 outputs the center position of the chosen subject to the pan head controller 12. The pan head controller 12 transmits the control signal for panning and tilting to the pan head 10 so that the center position is the center of the frame (step 236). This pans and tilts the housing 15 of the pan head 10 to turn the camera 40 to the subject to be followed. The present panning position, tilting position and zooming position (focusing position) are outputted from the pan head 10 to the pan head controller 12, which finds the panning position and the tilting position according to the positions and the center position inputted from the CPU 54 so that the center position is the center of the frame.

The present panning position and tilting position are outputted from the pan head controller 12 to the CPU 54, which determines whether or not the panning and the tilting have been stopped (step 238). If YES, the CPU 54 returns to step 212.

The subject to be followed is determined by the hue in the above-described way, and thus only the subject can be appropriately followed even if there are a plurality of moving subjects in the frame.

The histogram of the HUE values of the subject to be followed is produced in the area the user designates on the monitor at step 210, but the subject that moves first may be determined with the processing of steps 212–226 to automatically produce the histogram of the HUE values of the subject.

The shooting direction is changed to follow the subject in the embodiment, but the view angle (zooming position) as well as the shooting direction may be changed.

In addition, the TV camera is used in the embodiment, but the present invention is not limited to this, and a still camera (for example, a digital still camera) may be used.

As set forth hereinabove, in the automatic following device according to the present invention, the shooting is switched only to another registered shooting according to the position of the subject to be followed so that the subject is the center of the frame. Thus, the shooting condition do not change even if the subject to be followed moves a little within the field of view. Therefore, the image shot by the camera is not blurred. Also, since the desired zooming position as well as the panning position and the tilting position can be stored as the shooting conditions, the shooting is performed with the appropriate view angle according to the panning position and the tilting position.

As set forth hereinabove, in the automatic following device according to the present invention, the insensitive area is set in the frame, and only when the center position is out of the insensitive area, the camera is turned to shoot the subject. Thus, the shooting direction of the camera does not change even if the subject moves a little in the frame, and therefore the image is not blurred.

The range of the insensitive area is determined according to the position of the subject to be followed. For example, the farther the subject is from the center of the frame, the smaller the range of the insensitive area is. Therefore, the subject never goes out of the frame to be followed.

As set forth hereinabove, in the automatic following device according to the present invention, the subject can be followed while its specific part that is different from its center position is in the frame. For example, when the person is followed, the head of the person is in the frame.

As set forth hereinabove, in the automatic following device according to the present invention, the subject to be followed is determined by the hue. Thus, only the subject can be appropriately followed even if there are a plurality of moving subjects in the frame.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An automatic following device that follows a subject by changing a shooting condition that is at least one of a shooting direction and a view angle of a camera, said automatic following device comprising:
   a shooting registering device that previously registers one or more shootings by setting shooting conditions of the camera;
   a position determining device that determines a position of the subject; and
   a shooting changing device that changes one of the shootings to another registered by said shooting registering device according to the position of the subject determined by the position determining device so that the subject is in a frame of the camera.

2. The automatic following device as defined in claim 1, wherein said shooting changing device changes one of the shootings to a shooting other than the one when the position of the subject determined by the position determining device gets in a frame for the shooting.

3. An automatic following device that follows a subject by changing a shooting direction of a camera, said automatic following device comprising:
   a position determining device that determines a position of the subject;
   a determining device that determines whether or not the subject is in an insensitive area set in a frame of the camera, wherein a range of the insensitive area is determined according to the position of the subject in the frame; and
   a controlling device that does not change the shooting direction when said determining device determines that the subject is in the insensitive area and changes the shooting direction to follow the subject when said determining device determines that the subject is out of the insensitive area.

4. The automatic following device as defined in claim 3, wherein the farther the subject is from the center of the frame, the smaller the range of the insensitive area.

5. An automatic following device that follows a subject by changing a shooting direction of a camera, said automatic following device comprising:
   a controlling device that changes the shooting direction so that a specific part other than a center position of the subject is in a frame of the camera,
   wherein said controlling device changes the shooting direction so that the specific part of the subject is in the center of the frame of the camera, and
   wherein said controlling device determines the specific part of the subject so that an area ratio of one side of the subject divided along a vertical line with the specific part to the other side is a predetermined value and changes the shooting direction so that the specific part is on a vertical line with the center of the frame.

6. An automatic following device that follows a subject by changing a shooting direction of a camera, said automatic following device comprising:
   a controlling device that changes the shooting direction so that a specific part other than a center position of the subject is in a frame of the camera,
   wherein said controlling device changes the shooting direction so that the specific part of the subject is in the center of the frame of the camera, and
   wherein said controlling device determines the specific part of the subject so that an area ratio of one side of the subject divided along a horizontal line with the specific part to the other side is a predetermined value and changes the shooting direction so that the specific part is on a horizontal line with the center of the frame.

7. An automatic following device that follows a subject by changing a shooting direction of a camera, said automatic following device comprising:
   a first histogram producing device that produces a first histogram representing a hue of the subject to be followed;
   a moving subject abstracting device that abstracts moving subjects from images captured by the camera;
   a second histogram producing device that produces a second histogram representing a hue of each of the moving subjects;
   a subject choosing device that chooses one of the moving subjects of which the second histogram is closest to the first histogram the subject to be followed; and
   a controlling device that changes the shooting direction according to a position of the subject chosen by said subject choosing device.

* * * * *